(12) United States Patent
Bari

(10) Patent No.: US 8,656,460 B1
(45) Date of Patent: Feb. 18, 2014

(54) INTELLIGENT NETWORK ADVERTISEMENT FOR NETWORK SELECTION USING EAP

(75) Inventor: Farooq Bari, Bothell, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1468 days.

(21) Appl. No.: 11/291,425

(22) Filed: Dec. 1, 2005

Related U.S. Application Data

(60) Provisional application No. 60/724,381, filed on Oct. 7, 2005.

(51) Int. Cl.
- *G06F 7/04* (2006.01)
- *G06F 15/16* (2006.01)
- *G06F 17/30* (2006.01)
- *H04L 29/06* (2006.01)
- *H04W 4/00* (2009.01)

(52) U.S. Cl.
USPC .......... 726/3; 370/338; 455/432.1; 455/435.2

(58) Field of Classification Search
None
See application file for complete search history.

(56) References Cited

U.S. PATENT DOCUMENTS

| | | | |
|---|---|---|---|
| 7,292,592 B2* | 11/2007 | Rune | 370/401 |
| 2004/0192306 A1* | 9/2004 | Elkarat et al. | 455/435.2 |
| 2006/0077924 A1* | 4/2006 | Rune | 370/328 |
| 2006/0153135 A1* | 7/2006 | Ascolese et al. | 370/331 |
| 2007/0189241 A1* | 8/2007 | Zhang | 370/338 |
| 2009/0196265 A1* | 8/2009 | Mariblanca Nieves et al. | 370/338 |

FOREIGN PATENT DOCUMENTS

WO    WO 2005011305 A1 *    2/2005

* cited by examiner

*Primary Examiner* — Philip Chea
*Assistant Examiner* — Trong Nguyen
(74) *Attorney, Agent, or Firm* — Turocy & Watson, LLP

(57) ABSTRACT

In accessing communication networks using access technologies such as wireless LAN, a subset of intermediary network operators is selected in accordance with one or more optimization methods from among a larger set of potential intermediary network operators. The selected subset is advertised to a user's terminal so that authentication information can be passed between an access network and a user's home network.

21 Claims, 6 Drawing Sheets

INTELLIGENT NETWORK ADVERTISEMENT FOR NETWORK SELECTION USING EAP

CROSS-REFERENCE TO RELATED APPLICATIONS

The benefit of the filing date of U.S. provisional patent application Ser. No. 60/724,381, filed Oct. 7, 2005, entitled INTELLIGENT NETWORK ADVERTISEMENT FOR NETWORK SELECTION USING EAP, is hereby claimed, and the specification thereof is incorporated herein by this reference.

BACKGROUND OF THE INVENTION

1. Field of the Invention

The present invention relates generally to access networks, such as wireless local area networks (WLANs) and, more specifically, to a mechanism for optimizing a process of selecting one or more intermediary networks through which a roaming user is authenticated with his home network while using Extensible Authentication Protocol (EAP).

2. Description of the Related Art

The term "wireless local area networking" (WLAN) generally refers to the use of a local area network (LAN) in which data is transmitted by radio communication between the user's terminal (e.g., wireless-enabled laptop computer, handheld PDA, etc.) and a nearby device known as an access point. The access point, in turn, is part of a computer network known as an access network, and the user can transparently access computers or other devices connected to the network from the user's terminal, as though the user's device were connected to the network via a wired connection.

A WLAN interworking architecture developed by the Third-Generation Partnership Program (3GPP), a consortium of telecommunications standards bodies operating under a collaboration agreement, provides an architecture in which a user's terminal can connect via a WLAN to a remote data network; such as the Internet or a core network of cellular telecommunication systems. The mechanism as it applies to cellular telecommunication operators inter-working with WLANs is defined in 3GPP's Release 6 documents, TS 23.234 and TS 24.234.

"Public WLAN" is a term that generally refers to the placement of access points in publicly accessible areas, such as airport lounges, waiting rooms, and coffeehouses, giving rise to areas known as "hotspots" in which users can access remote networks to check e-mail, surf the Internet, upload and download files, and so forth. Accessing the Internet using public access WLAN can be considered an alternative to accessing it using third-generation ("3G") high-bandwidth cellular data service. Indeed, it has been suggested that terminals be capable of roaming between 3G and WLAN and be able to access 3G services via WLAN. Accordingly, it has been suggested that charges for accessing the WLAN services be charged to the user's cellular service provider bill.

To the public access WLAN operator (i.e., hotspot operator), billing or accounting is one of the most important aspects of the overall process known as authentication, authorization and accounting (AAA). The user's home network (HN), such as a cellular telecommunication services provider with which the user has a subscription agreement, includes an AAA server that performs the AAA function in conjunction with an AAA proxy server that is part of the access network. The authentication process involves routing AAA information to the HN's AAA server. Because all public WLAN operators may not have roaming agreements directly with the operator of the user's HN, routing in such cases must occur via one or more intermediary networks or brokers, whose operators have roaming agreements with the WLAN operator, the user's HN operator, or other intermediary network operators.

The Internet Engineering Task Force (IETF), an open consortium of network designers, operators, vendors, and researchers concerned with the evolution of the Internet architecture and the smooth operation of the Internet, has defined a protocol known as Extensible Authentication Protocol (EAP) that provides an authentication framework supporting multiple authentication methods. EAP can be used by various access network technologies, including WLAN technology.

One difficulty in the authentication process is selecting the intermediary network(s) through which to route the AAA information. In the most common authentication schemes, the user's terminal plays a primary role in the selection of intermediary networks. 3GPP has suggested the use of EAP to have the WLAN provide or "advertise" information or "hints" to the user's terminal to aid the terminal in selecting one or more intermediary network(s) through which to route the AAA information. The information can be, for example, a list of WLAN operators' roaming partners, i.e., intermediary operators with whom the WLAN operator has a roaming agreement. 3GPP's suggestion includes that the terminal indicate the selected routing by inserting information into or "decorating" a Network Access Identifier (NAI) and transmitting it to the WLAN.

The above-described EAP-based IETF method is limited by the capacity of the EAP Request/Identity packet that the WLAN would transmit to the terminal (as well as the fact that EAP messages cannot be fragmented). It has been estimated that a selection of as many as about 50 roaming partners could be advertised in this manner without exceeding the limitations of the protocols involved. With the worldwide increase in public access WLAN operators, however, potential intermediary operators may number in the hundreds. Clearly, it would be impractical to advertise this many potential intermediary operators, even if a higher-capacity alternative to EAP existed. Even the advertisement of only 50 roaming partners may not be considered an appropriate use of airlink resources by the access network operator, who may prefer to advertise far fewer roaming partners than the maximum possible.

Accordingly, it can be seen that a need remains in the art for a system and method for selecting a limited set of potential intermediary operators to advertise to a user's terminal. It is to such a system and method that the present invention is primarily directed.

SUMMARY OF THE INVENTION

The present invention relates to a system and method for optimizing a process of selecting, from a relatively large set of potential intermediary network operators, a smaller set of intermediary network operators to advertise to a user's terminal through which to pass authentication information between an access network and a user's home network.

In an exemplary embodiment of the invention, an authentication (AAA) server of the access network with which the user's terminal is communicating identifies the user's home network and retrieves network information from a database in response to the identified home network. As used in this patent specification, the term "database" includes not only relational databases but also any suitable structure or storage scheme, local or remote, from which pre-stored information can be retrieved. The authentication server selects, from a predetermined set of potential intermediary network operators, a subset of intermediary network operators, at least partly in response to the network information retrieved from the database. The authentication server then transmits or "advertises" the subset of intermediary network operators to the terminal. In response, the terminal selects one or more of the advertised intermediary operators. Suitable processes or methods by which such a terminal can select advertised intermediary operators are conventional and well-understood in the art and are therefore not described in further detail in this patent specification.

The terminal transmits its selection to the access network authentication server, which uses the selection to initiate what is known in the art as an "authentication conversation," i.e., a bi-directional communication of authentication information with the home network authentication server. Such an authentication process is conventional and well-understood in the art and is therefore not described in further detail in this patent specification. If the home network authenticates the user (terminal) to the access network authentication server, the access network authentication server allows the terminal to use the access network, e.g., to communicate with a server or other device on that network or a remote network accessed through the access network, such as the Internet or a sub-network thereof.

In one preferred form, the access network authentication server can select the subset of intermediary network operators to advertise to the user's terminal if it has access to information about mutual roaming partners. Such information typically can reside in an information database that can associate intermediary operators who are roaming partners of an operator of the access network to which the authentication server belongs with any intermediary network operators who are roaming partners of the home network operator. This information can be pre-stored in the database by the access network operator and updated as needed. The access network authentication server can look up in the database any such mutual roaming partners of the access network operator and home network operator. The access network authentication server can then select one or more of those mutual roaming partners for inclusion in the subset of intermediary network operators.

In another preferred form, the access network authentication server can select the subset of intermediary network operators to advertise to the user's terminal based upon knowledge of roaming agreements of intermediary network operators in the same geographic region as the user's home network operator. The database associates the identities of the access network's roaming partners with the geographic regions in which they operate and/or regions in which they have extensive roaming agreements. The authentication server can look up in the database any network operators who have roaming agreements in the same region as the home network. The authentication server can then select for inclusion in the subset of intermediary network operators one or more of such intermediary network operators.

In still another preferred form, the authentication server can select the subset of intermediary network operators to advertise to the user's terminal based upon the existence of a prior successful attempt at authenticating another user who belonged to the home network to which the present user belongs. The database associates instances of such prior successful authentication attempts with the identities of the access network's roaming partners, and each time an attempt is successful the authentication server can update the database to note the roaming partners through which authentication was successful. The authentication server can look up in the database any intermediary operators through whom one or more prior authentication attempts for the user's home network have been successful. The authentication server can then select one or more of those intermediary network operators for inclusion in the subset of intermediary network operators.

In any of the above-described forms, the access network authentication server can also prioritize the intermediary operators in accordance with pre-established criteria, such as whether using a certain intermediary operator would result in more revenue to the access network than using another intermediary operator or any other suitable criteria. The authentication server can advertise to the user's terminal only those intermediary operators who have a priority above a predetermined threshold, e.g., the top five intermediary operators. Alternatively, in other embodiments the authentication server can advertise to the user's terminal an initial subset of intermediary operators having higher priorities than the others. If the response the authentication server receives from the terminal indicates that the terminal is unable to make a selection from that initial subset, the authentication server can advertise another subset of intermediary operators having priorities lower than those in the initial subset.

DETAILED DESCRIPTION

Figure 1:
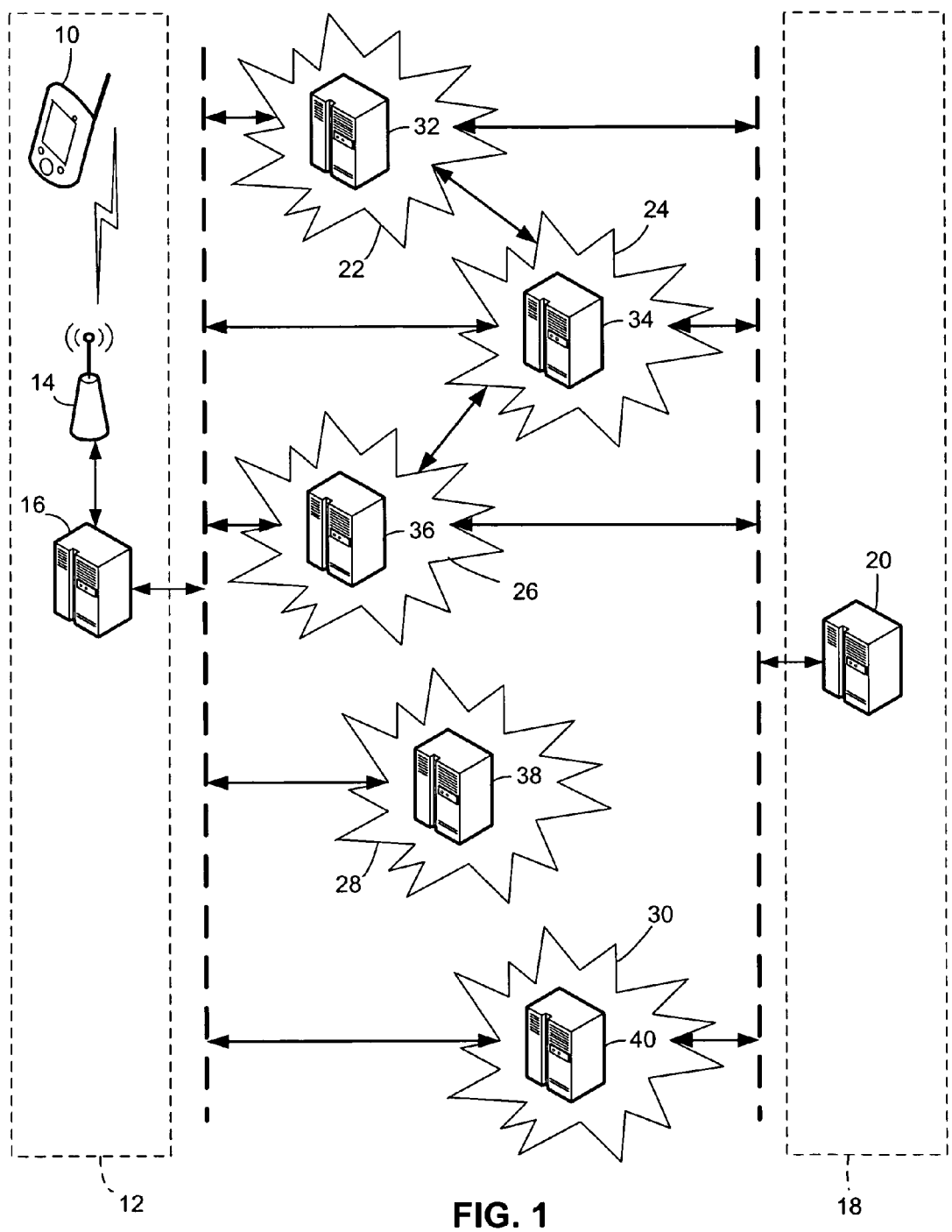
FIG. 1 illustrates an exemplary embodiment of a system in which one or more intermediary network operators are selected for routing authentication information between a user's terminal and the user's home network.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention.

As illustrated in FIG. 1, a user in possession of a terminal 10, such as a wireless personal digital assistant (PDA), wireless-enabled cellular telephone, laptop computer, palmtop computer, etc., may desire to access a device (not shown), such as a computer, server, etc. The network to which the device the user wishes to access belongs can be access network 12 itself or another network (not shown) that is interconnected with access network 12. For example, the user may wish to interact with and retrieve content from a server on a network that is in communication with access network 12, such as a network that is a part of or interconnected with the global super-network presently referred to as the Internet. If the user brings terminal 10 into an area in which an access network 12 provides wireless local area network (WLAN) coverage, also referred to in the art as a "hotspot," terminal 10 initiates communication for authentication purposes with an access point 14. Access point 14 in turn allows terminal 10 to communicate with an authentication, authorization and accounting (AAA) proxy server or similar type of AAA server 16. Access point 14 can be located in the conventional manner in, for example, a public or semi-public area such as an airport lounge, coffeehouse, waiting room, etc., as known in the art.

The user of terminal 10 belongs to a home network (HN) 18. That is, the user has a subscription agreement with an operator of network 18 through which the operator provides the user with telecommunications services, which include data network access and may also include cellular telephone services and other such services. Accordingly, charges for accessing computer networks via remote access networks, such as access network 12, can be included in the normal monthly bill that the user receives from the operator of network 18. The operator of network 18 can ensure that the operator of access network 12 receives compensation for the user's use of access network 12 in accordance with agreements among the parties involved. To authenticate the user's identity and thereby ensure that the user can be properly billed in this manner, an authentication process must be performed. As explained below in further detail, the authentication process involves what is referred to in the art as a "conversation" between AAA server 16 and a similar AAA server 20 of the user's home network 18. The conversation comprises an exchange of electronic messages. Only if the user is successfully authenticated as a result of the authentication conversation does AAA server 16 allow terminal 10 to access content servers or other devices (not shown) that are part of or interconnected with access network 12.

In addition to the user's home network 18 and access network 12, there may be one or more intermediary networks 22, 24, 26, 28, 30, etc., involved in the authentication process. (There can be more or fewer such intermediary networks, interconnected with one another or with other networks in any suitable manner, and the networks 22-30 shown in FIG. 1 and manner (or network topography) in which they are shown to be interconnected is merely intended to be exemplary for purposes of illustration.) Intermediary networks 22-30, etc., can be any suitable type of network and may be similar to the user's home network 18 and operate in a manner similar to that in which the user's home network 18 operates. In the context of the authentication process to which the present invention relates, one or more of intermediary networks 22-30 can be selected to form a path or chain through which to route information between AAA server 16 and AAA server 20 during the authentication conversation. As described in further detail below, terminal 10 is involved in this process of selecting intermediary networks. The present invention relates more specifically to selecting, from what potentially can be a relatively large set of potential intermediary networks 22-30, a smaller, more manageable or otherwise more desirable set (i.e., a subset) to advertise to terminal 10.

The operator of access network 12 can have roaming agreements with one or more of intermediary networks 22-30, such as those indicated by arrows in FIG. 1 between access network 12 and home network 18. Operators of intermediary networks 22-30 who have roaming agreements with each other are also called roaming partners. In the exemplary roaming partner arrangement indicated in FIG. 1 by arrows, the operator of access network 12 is a roaming partner with each of the operators of intermediary networks 22-30. In addition, the operators of intermediary networks 22 and 24 are roaming partners with each other, as are the operators of intermediary networks 24 and 26. In this exemplary arrangement, the operator of home network 18 is also a roaming partner with each of the operators of intermediary networks 22, 24, 26 and 30. Each of intermediary networks 22, 24, 26, 28 and 30 has its own AAA server 32, 34, 36, 38 and 40, respectively.

Figure 2:
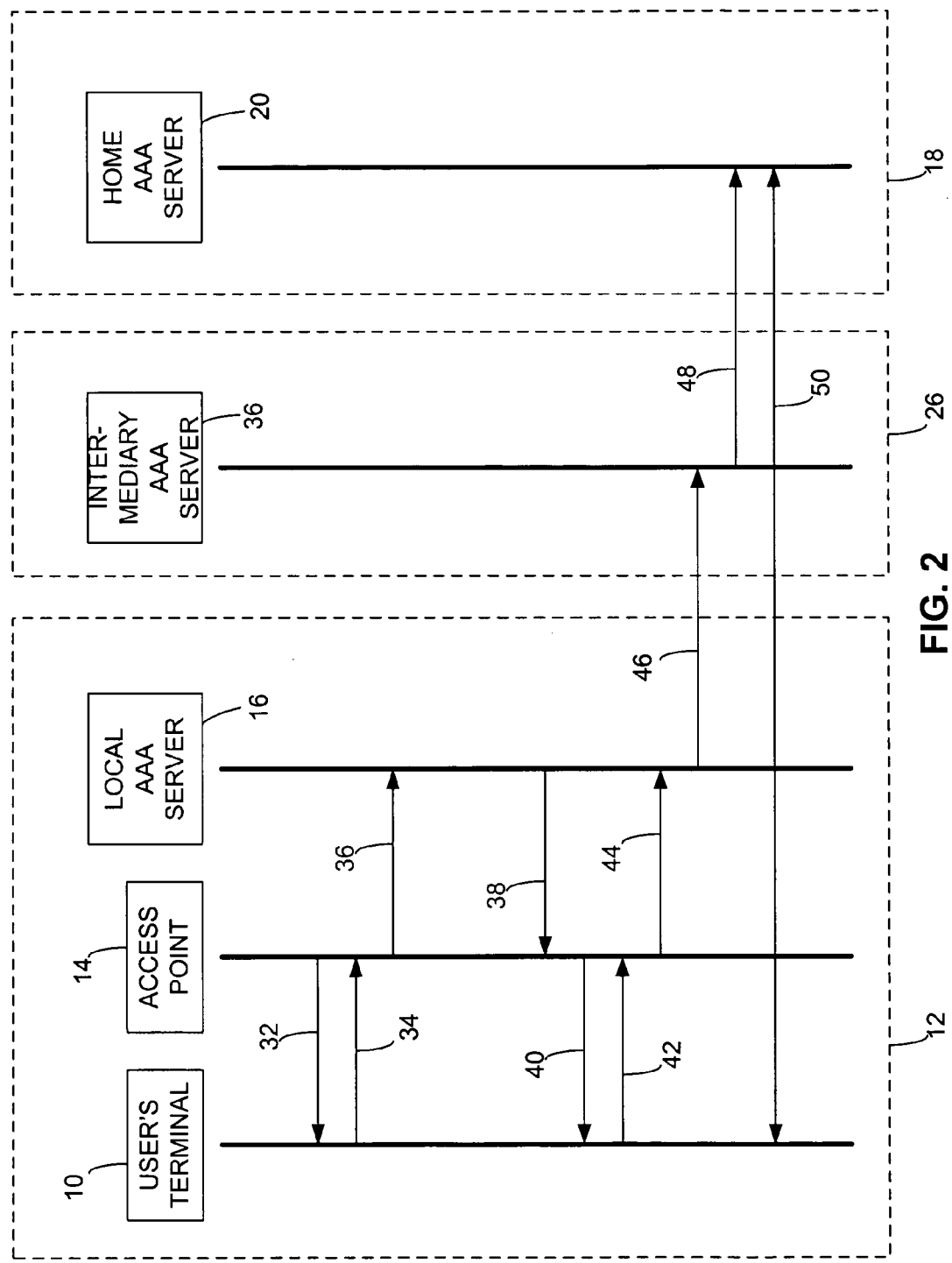
FIG. 2 is a communication sequence diagram illustrating an exemplary sequence of communications among the elements depicted in FIG. 1.

As illustrated in FIG. 2, an example of an instance in which terminal 10 undergoes an authentication process can comprise the following exemplary sequence of communications. When terminal 10 first enters the hotspot and initiates communication with access point 14, access point 14 first communicates 32 an Extensible Authentication Protocol (EAP) Identity Request to terminal 10. EAP provides an authentication framework that supports multiple authentication methods. It defines how messages are communicated between an authenticator (e.g., access point 14 in this example) and a software element in the user terminal (e.g., terminal 10 in this example) known as an EAP Peer. EAP is well-known to persons skilled in the art and is therefore not described herein in further detail. It is sufficient to note that, among the messages defined by EAP, there is defined an Identity Request, which is a message requesting the EAP Peer to provide some information, such as its identity, in order to start the authentication process. Although EAP and the EAP Identify Request are described with regard to the exemplary embodiment of the invention, in other embodiments other protocols and the messages associated with those protocols may be suitable.

The EAP Peer in terminal 10 recognizes and responds to the Identity Request. The EAP Peer and other elements of terminal 10 are conventional and well-known in the art and are therefore not described herein in further detail. In response to the EAP Identity Request, the EAP Peer causes terminal 10 to communicate 34 to access point 14 an EAP Identity Response containing an "undecorated" Network Access Identifier (NAI). An NAI is an identifier that represents the subscriber or user identity. The basic form of an NAI is user@realm, where the part preceding the ampersand identifies the user, and the part that identifies the user's home network 18 is the "realm." For example, an NAI iohn.doe@operator1.com would indicate that the user is known as "john.doe," and the user's home network 18 is known as "operator1." As in the case of the Identity Request, it is sufficient to note that, among the messages defined by EAP, there is defined an Identity Response, which is an EAP message sent by the EAP Peer in response to the EAP Identity Request message. Although EAP and the EAP Identify Response are described with regard to the exemplary embodiment of the invention, in other embodiments other protocols and the messages associated with those protocols may be suitable.

Access point 14 then communicates 36 to AAA server 16 the information indicating the user's home network 18 using the EAP Identity Response message encapsulated in an AAA protocol such as RADIUS. In an embodiment in which RADIUS is used, the message will be encapsulated in a RADIUS Access-Request message. RADIUS is a well-known authentication, authorization and accounting protocol defined by IETF and is used to control network access.

AAA server 16 can then perform a selection process or method, described below in further detail, that determines a subset of one or more of intermediary networks 22-30 through which to route the authentication information. The method is based upon information regarding intermediary networks 22-30, roaming relationships among network operators, and other network information that is pre-stored in AAA server 16, e.g., in a database, or that otherwise can be retrieved by AAA server 16. AAA server 16 uses the identity of the user's home network 18 as a key or otherwise as a basis upon which to look up information stored in the database. In some instances, the pre-stored information may indicate that the operator of access network 12 has a roaming agreement with the user's home network 18. In such instances, there is no need to advertise to terminal 10 any of intermediary networks 22-30, as authentication information can be exchanged directly between AAA server 16 of access network 12 and AAA server 20 of access network 20. In all other instances, the method for selecting a subset of intermediary network operators to advertise to terminal 10 can be performed as described below with regard to FIGS. 3-6.

Once AAA server 16 has selected a subset of intermediary network operators using the network information retrieved from the database, AAA server 16 communicates 38 to access point 14 via an AAA protocol (e.g., RADIUS) an encapsulated Identity Request message. Access point 14 in turn communicates 40 the EAP Identity Request containing the intermediary network(s) selection to terminal 10. The act of communicating 40 information identifying one or more intermediary networks is known in the art as "advertising" the intermediary networks to terminal 10.

The EAP Peer in terminal 10 can then select one or more of the advertised intermediary networks 22-30. Suitable processes or methods by which terminal 10 can select intermediary operators are conventional and well-understood in the art and are therefore not described in further detail herein. The EAP can then "decorate" an NAI in the manner known in the art and respond to the Access-Challenge by communicating 42 an Identity Response containing the decorated NAI. "Decoration" is a term that refers to adding realm information to the NAI for the intermediary operators. The following is an example of an NAI decorated in a manner that identifies selected intermediary networks: homenetwork.com!user@intermediarynetwork.com. In this example, the realm information before the exclamation point ("!") indicates the user's home network, while realm information after the ampersand ("@") indicates the intermediary network selected by the EAP Peer. Access point 14 then communicates 44 this EAP Identity Response to AAA server 16.

From the decorated NAI, AAA server 16 is able to identify another AAA server to which the message containing the decorated NAI can be properly forwarded. The next-hop AAA server is indicated by the realm information after the ampersand ("@") in the decorated NAI. In the example above, AAA server 16, by looking at the decorated NAI homenetwork.com!user@intermediarynetwork.com, is able to identify "intermediarynetwork.com" as the realm of the next-hop AAA server to which this AA message is to be forwarded. That AAA server, in turn removes "intermediarynetwork.com" from the NAI (i.e., it removes the decoration) and moves the realm information from before the exclamation point (T) to after the ampersand ("@"). Thus, the updated NAI would become user@homenetwork.com. Based on the realm information after the ampersand ("@"), the AAA server would now forward the AAA message to the user's home realm. In this way, the AAA servers are capable of identifying the next AAA server in the path or chain leading to AAA server 20 of home network 18. For example, AAA server 16 may determine from the decorated NAI it receives that it should communicate 46 the message containing the decorated NAI to AAA server 36 of intermediary network 26. In turn, AAA server 36 determines that it should communicate 48 the message to AAA server 20 of home network 18. Once the initial communication from AAA server 36 to AAA server 20 has been made, the authentication conversation 50 between them can occur in the conventional manner.

Figure 3:
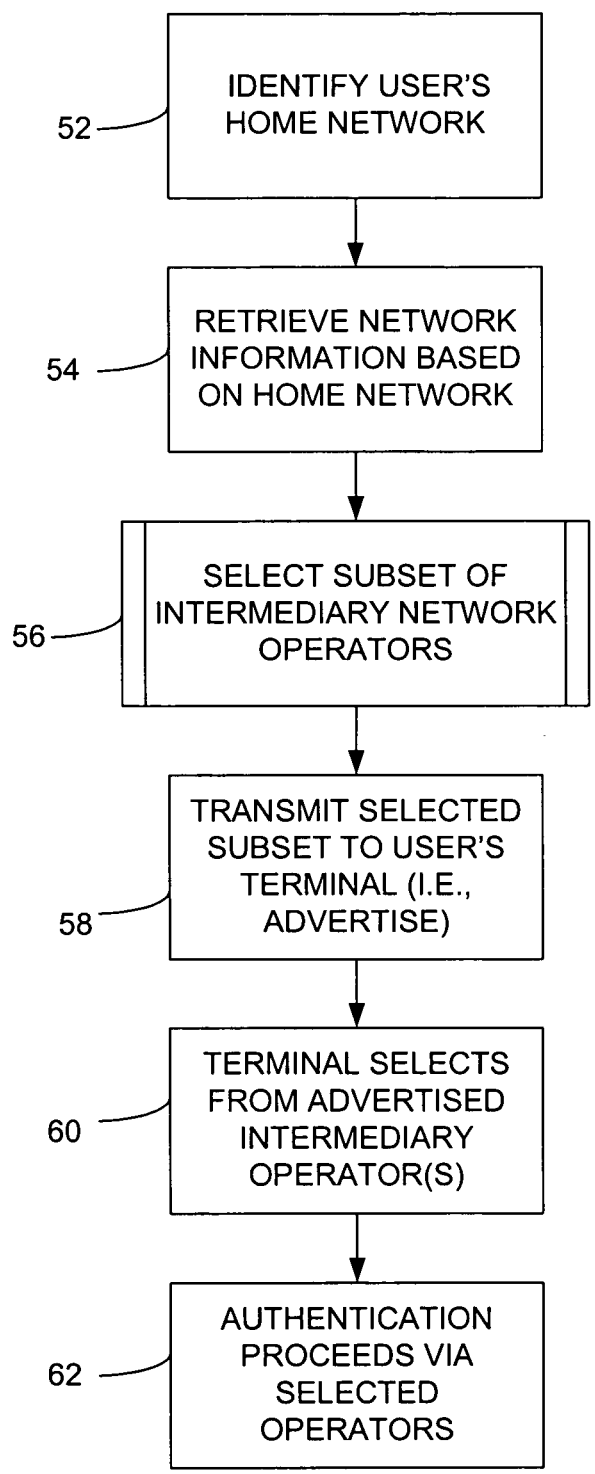
FIG. 3 is a flow diagram illustrating an exemplary method of operation of the system of FIG. 1.

The method is more generally illustrated by the flow diagram of FIG. 3. At step 52, the user's home network 18 (FIGS. 1-2) is identified. This step can comprise, for example, the processing of communications 32-36 described above with regard to FIG. 2. At step 54, AAA server 16 retrieves network information from a database or similar storage in response to the identity of the user's home network 18. At step 56, AAA server 16 selects a subset of intermediary networks 22-30 to advertise. Several exemplary methods for making this selection are described in further detail below. At step 58, AAA server 16 transmits (i.e., advertises) the selected subset to terminal 10. This step can comprise, for example, the processing of communications 38 and 40 described above with regard to FIG. 2. At step 60, terminal 10 selects one or more of the advertised intermediary networks and transmits its selection to AAA server 16. This step can comprise, for example, the processing of communications 42 and 44 described above with regard to FIG. 2. Authentication can then proceed in the conventional manner through the path or chain of one or more selected intermediary networks, as indicated by step 62.

Figure 4:
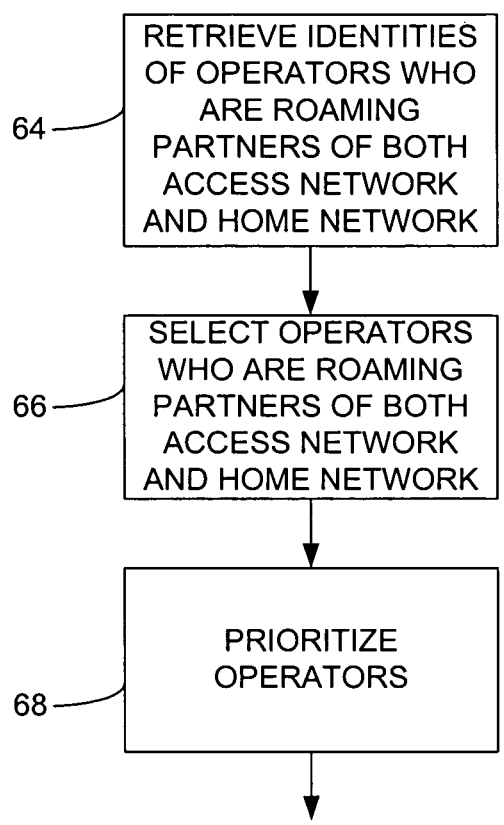
FIG. 4 is a flow diagram illustrating in further detail a method for the intermediary network selection step of FIG. 3.

An exemplary method for performing step 56 of selecting a subset of intermediary networks 22-30 to advertise is illustrated by the flow diagram of FIG. 4. At step 64, AAA server 16 retrieves from the database information identifying any network operators who are roaming partners of both access network 12 and home network 18. If any such network operators exist, AAA server 16 can select those network operators, as indicated by step 66.

An additional step 68 of prioritizing the selected intermediary network operators or other intermediary network operators can be performed in some embodiments of the invention. For example, the intermediary network operators can be ranked according to predetermined criteria, such as the amount of revenue likely to be generated by the use of those intermediary network operators or are preferred over other network operators for other reasons. Also, AAA server 16 can initially advertise only a predetermined number of the highest-ranked intermediary network operators. If terminal 10 fails to select one or more of those that are initially advertised, AAA server 16 can then advertise another set of intermediary network operators that have rankings lower than those initially advertised, and so on, until terminal 10 makes a selection.

Figure 5:
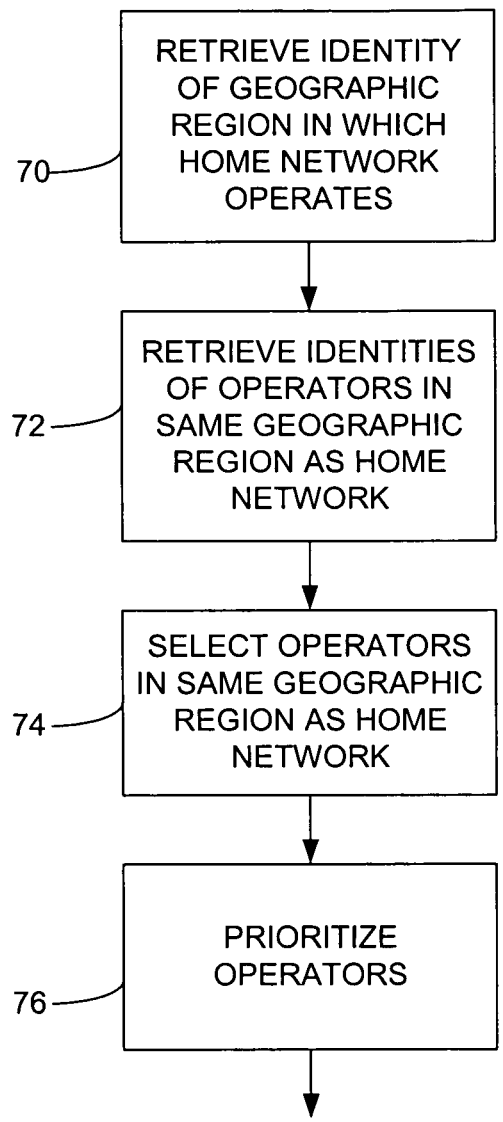
FIG. 5 is a flow diagram illustrating in further detail an alternative method for the intermediary network selection step of FIG. 3.

Another exemplary method for performing step 56 (FIG. 3) of selecting a subset of intermediary networks 22-30 to advertise is illustrated by the flow diagram of FIG. 5. At step 70, AAA server 16 retrieves from the database information it can use to identify the country or geographic region in which the user's home network 18 is located. For example, the realm part of the NAI can include country identifiers, such as "uk," "nz," "pk," etc., and the database can use this information to identify the region or country. Alternatively, in other embodiments, the geographic location of the realm part may be pre-stored in the database. For example, it may be known and thus an indication stored in the database that a network operator known as "operator1" operates only in the United Kingdom). In any event, at step 72 AAA server 16 uses the country identifier or knowledge of the location in which an identified network operates to look up network operators in the database. If the database indicates that any network operators exist that have extensive roaming agreements in the country or geographic region in which the user's home network 18 is located, AAA server 16 can select those networks, as indicated by step 74. In some embodiments, an additional step 76 of prioritizing the selected networks can be performed in the same manner as described above with regard to step 68 (FIG. 4).

Figure 6:
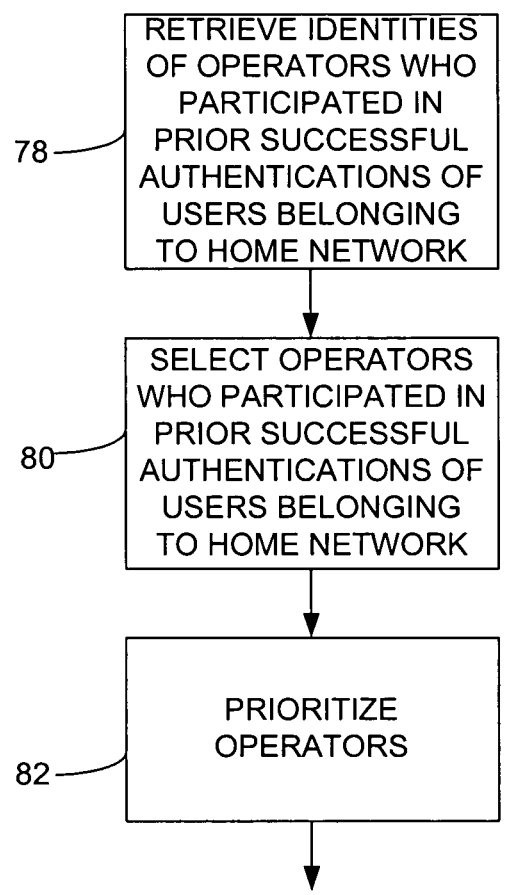
FIG. 6 is a flow diagram illustrating in further detail still another alternative method for the intermediary network selection step of FIG. 3.

Another exemplary method for performing step 56 (FIG. 3) of selecting a subset of intermediary networks 22-30 to advertise is illustrated by the flow diagram of FIG. 6. At step 78, AAA server 16 retrieves from the database information identifying any intermediary network operators who participated in prior successful authentications of users belonging to the current user's home network 18. Information identifying a home network and the intermediary networks through which authentication proceeded can be stored each time an authentication is successful. If any such networks are found to exist in the database, AAA server 16 can select them, as indicated by step 80. In some embodiments, an additional step 82 of prioritizing the selected networks can be performed in the same manner as described above with regard to step 68 (FIG. 4).

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. For example, although the invention has been described as applicable to WLAN, it can be applied to any other suitable access technology for which it is known to use EAP-based authentication or for which it would occur to persons skilled in the art to use EAP-based authentication in view of the teachings herein. With regard to the claims, no claim is intended to invoke the sixth paragraph of 35 U.S.C. Section 112 unless it includes the term "means for" followed by a participle.

What is claimed is:

1. A method, comprising:
   identifying, by an authentication system comprising a processor, intermediary operator devices that participated in successful authentications of mobile devices associated with a home network via respective intermediary networks communicatively coupled between an access network associated with the authentication system and the home network, wherein the intermediary operator devices are configured to facilitate roaming with an access operator device of the access network;
   in response to the identifying of the intermediary operator devices, updating, by the authentication system, a data store with information associating the successful authentications with the intermediary operator devices;
   selecting, by the authentication system based on the information, a set of intermediary operator devices including at least one of the intermediary operator devices;
   prioritizing, by the authentication system, the set of intermediary operator devices, wherein the prioritizing comprises ranking the intermediary operator devices based on estimated amounts of revenue directed to the access network associated with an estimated use of the intermediary operator devices; and
   sending, by the authentication system via an access point device of the access network, a message identifying a subset of intermediary operator devices from the prioritized set of intermediary operator devices to a remote device that is different from the mobile devices and that is associated with the home network.

2. The method of claim 1, wherein the selecting comprises selecting an intermediary operator device of the intermediary operator devices that is configured to facilitate roaming with a home operator device of the home network.

3. The method of claim 1, further comprising:
   associating, by the authentication system, the set of intermediary operator devices with a plurality of geographic regions;
   identifying, by the authentication system, a geographic region of the plurality of geographic regions where a home operator device of the home network is configured to operate; and
   selecting, by the authentication system, an intermediary operator device of the set of intermediary operator devices that is associated with the geographic region.

4. The method of claim 1, wherein the prioritizing further comprises:
   selecting a first operator device of the intermediary operator devices having a first priority that is higher than a second priority of a second operator device of the intermediary operator devices; and
   in response to determining that a valid network selection was not received from the remote device after sending an initial selection set of the intermediary operator devices to the remote device, repeating the selecting the set of intermediary operator devices with a subsequent selection of intermediary operator devices having a lower priority than the first operator device.

5. The method of claim 1, wherein the sending of the message further includes sending the message to the remote device via a wireless local area network.

6. The method of claim 1, further comprising:
   facilitating transmitting, via the access point device, an extensible authentication protocol identity request to an extensible authentication protocol peer of the remote device; and
   facilitating receiving, via the access point device, an extensible authentication protocol identity response including an undecorated network access identifier indicating the home network.

7. The method of claim 6, further comprising:
   facilitating transmitting, via the access point device, an extensible authentication protocol access challenge message packet encapsulating another extensible authentication protocol identity request including a portion of the information representing the subset of intermediary operator devices to the remote device.

8. The method of claim 7, further comprising:
   facilitating receiving, via the access point device, another extensible authentication protocol identity response including a network access identifier indicating a selection of one of the intermediary operator devices.

9. The method of claim 1, wherein the selecting further comprises:
   identifying an intermediary operator device of the set of intermediary operator devices that is configured to facilitate roaming with a home operator device of the home network; and
   selecting the intermediary operator device.

10. The method of claim 1, wherein the selecting further comprises:
    identifying an intermediary operator device of the set of intermediary operator devices that is configured to operate within a geographic region associated with the home network; and
    selecting the intermediary operator device.

11. The method of claim 1, wherein the selecting further comprises:

associating instances of prior authentication attempts with home networks including the home network; and selecting based on the instances, an intermediary operator device of the set of intermediary operator devices that is associated with a number of the successful authentications.

12. The method of claim 1, further comprising:

selecting, by the authentication system, an intermediary operator device of the intermediary operator devices having a higher priority than another intermediary operator device of the intermediary operator devices; and in response to determining, by the authentication system, that a valid intermediary operator device selection was not received from the remote device in response to sending, by the authentication system, an initial selection set of the intermediary operator devices to the remote device, repeating, by the authentication system, the selecting the set of the intermediary operator devices with a subsequent selection of intermediary operator devices having a lower priority than the intermediary operator device.

13. A computer-readable storage device comprising executable instructions that, in response to execution, cause authentication server of an access network including a processor to perform operations, comprising:

in response to determining intermediary network operator devices that participated in successful authentications of mobile devices associated with a home network via respective intermediary networks communicatively coupled between the access network and the home network, associating, with a data store, the successful authentications with respective intermediary network operator devices of the intermediary network operator devices that are configured to facilitate roaming with an access operator device of the access network;

creating, using the data store, information identifying a group of the intermediary network operator devices including at least one of the respective intermediary network operator devices;

prioritizing the group of the intermediary network operator devices, wherein the prioritizing comprises ranking a portion of the intermediary network operator devices of the group based on estimated amounts of revenue directed to the access network associated with estimated use of the portion of the intermediary network operator devices; and sending, via the access operator device, a message identifying a subset of intermediary network operator devices from the prioritized group to a mobile device that is distinct from the mobile devices and that is associated with the home network.

14. The computer-readable storage device of claim 13, wherein the operations further comprise:

associating a set of the intermediary network operator devices that are configured to facilitate roaming with an operator device of the access network with another portion of the intermediary network operator devices that are configured to facilitate roaming with a home operator device of the home network; and selecting a subset of the set of the intermediary network operator devices including selected intermediary network operator devices that are configured to facilitate roaming with both the operator device of the access network and the home operator device of the home network.

15. The computer-readable storage device of claim 13, wherein the operations further comprise:

associating intermediary network operator devices with geographic regions; and selecting an intermediary network operator device of the intermediary network operator devices that is configured to operate in a geographic region of the geographic regions that is associated with the home network.

16. A system, comprising:

a memory to store executable instructions; and a processor, coupled to the memory, that facilitates execution of the executable instructions to perform operations, comprising:

identifying intermediary network operator devices that facilitated successful authentications of mobile devices associated with a home network via respective intermediary networks communicatively coupled between an access network and the home network and that facilitated roaming with an access device of the access network;

in response to the identifying of the intermediary network operator devices, modifying a data store with correlation information that associates the intermediary network operator devices with the successful authentications;

generating, based on the correlation information, information identifying a set of intermediary network operator devices including an intermediary network operator device of the intermediary network operator devices;

prioritizing the set of intermediary network operator devices, wherein the prioritizing comprises ranking the intermediary network operator devices based on estimated amounts of revenue directed to the access network associated with estimated use of the intermediary network operator devices; and sending, via the access network, a message identifying a subset of the intermediary network operator devices from the prioritized set of intermediary network operator devices to a mobile device that is different from the mobile devices and that is associated with the home network.

17. The system of claim 16, wherein the operations further comprise:

associating a first set of intermediary network operator devices that are configured to facilitate roaming with an access operator device of the access network with a second set of intermediary network operator devices that are configured to facilitate roaming with a home operator device of the home network; and selecting a group of intermediary network operator devices that are configured to facilitate roaming with the access operator device and the home operator device.

18. The system of claim 16, wherein the operations further comprise:

associating the intermediary network operator devices with respective geographic regions; and identifying another intermediary network operator device of the intermediary network operator devices that is configured to operate in a geographic region of the geographic regions.

19. The system of claim 16, wherein the operations further comprise:

prioritizing the intermediary network operator devices based on a number of indications of the successful authentications.

20. The system of claim 16, wherein the operations further comprise:
- selecting a first intermediary network operator device of the intermediary network operator devices having a first priority that is higher than a second priority of a second intermediary network operator device of the intermediary network operator devices; and
- in response to a valid intermediary network operator device selection being determined not to have been received from another mobile device after the message was transmitted to the other mobile device, selecting a third intermediary network operator device of the intermediary network operator devices having a third priority that is lower than the first priority.

21. The system of claim 16, wherein the operations further comprise:
- prioritizing the intermediary network operator devices based on the home network.

\* \* \* \* \*